(12) United States Patent
Ciliberti et al.

(10) Patent No.: US 11,789,469 B1
(45) Date of Patent: Oct. 17, 2023

(54) SYSTEMS AND METHODS FOR PACKAGE DELIVERY WITH UNMANNED AERIAL VEHICLES

(71) Applicant: Express Scripts Strategic Development, Inc., St. Louis, MO (US)

(72) Inventors: John Ciliberti, Sparta, NJ (US); Jacob J. Reinhardt, Wentzville, MO (US); Robert E. Hoffman, Linden, IN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 822 days.

(21) Appl. No.: 16/803,136

(22) Filed: Feb. 27, 2020

(51) Int. Cl.
| | |
|---|---|
| B64C 39/02 | (2023.01) |
| B64U 10/13 | (2023.01) |
| B64U 50/19 | (2023.01) |
| B64U 80/86 | (2023.01) |
| B64U 101/60 | (2023.01) |
| G05D 1/12 | (2006.01) |
| B64D 27/24 | (2006.01) |
| B64D 47/08 | (2006.01) |
| B64F 1/36 | (2017.01) |
| B60L 50/60 | (2019.01) |
| B60L 53/50 | (2019.01) |
| B60L 53/80 | (2019.01) |
| B64D 9/00 | (2006.01) |
| G06Q 10/0834 | (2023.01) |

(52) U.S. Cl.
CPC .......... *G05D 1/12* (2013.01); *B60L 50/60* (2019.02); *B60L 53/50* (2019.02); *B60L 53/80* (2019.02); *B64C 39/024* (2013.01); *B64D 9/00* (2013.01); *B64D 27/24* (2013.01); *B64D 47/08* (2013.01); *B64F 1/36* (2013.01); *G06Q 10/0834* (2013.01); *B60L 2200/10* (2013.01); *B64U 10/13* (2023.01); *B64U 50/19* (2023.01); *B64U 80/86* (2023.01); *B64U 2101/60* (2023.01)

(58) Field of Classification Search
CPC ............ B64C 39/024; B64C 2201/128; B64U 2101/60; B64U 2101/64
See application file for complete search history.

(56) References Cited

U.S. PATENT DOCUMENTS

| | | | |
|---|---|---|---|
| 8,600,903 | B2 | 12/2013 | Eller |
| 8,948,935 | B1 | 2/2015 | Peeters |
| 9,244,147 | B1 | 1/2016 | Soundararajan |
| 9,384,668 | B2 | 7/2016 | Raptopoulos |

(Continued)

FOREIGN PATENT DOCUMENTS

| | | | | |
|---|---|---|---|---|
| AU | 2019101130 A4 | * | 1/2020 | |
| DE | 102019122135 A1 | * | 2/2020 | ........... B64C 39/024 |

(Continued)

*Primary Examiner* — Christopher P Ellis
(74) *Attorney, Agent, or Firm* — Stinson LLP

(57) ABSTRACT

A package delivery system for delivering a plurality of packages with one or more unmanned aerial vehicles (UAVs) includes a package receptacle to receive and store the plurality of packages. A charging station charges a plurality of UAV batteries which power the one or more UAVs. A UAV landing pad permits the one or more UAVs to land thereon. A loader loads a package of the plurality of packages and/or a UAV battery of the plurality of UAV batteries onto the UAVs when the UAVs are on the UAV landing pad. A transporter moves the packages and/or the UAV batteries s toward the loader.

23 Claims, 11 Drawing Sheets

(56) References Cited

U.S. PATENT DOCUMENTS

| | | | |
|---|---|---|---|
| 9,387,928 B1* | 7/2016 | Gentry | B60L 53/00 |
| 9,536,216 B1 | 1/2017 | Lisso | |
| 9,561,871 B2 | 2/2017 | Sugumaran | |
| 9,573,684 B2 | 2/2017 | Kimchi | |
| 9,659,502 B1 | 5/2017 | Abebe | |
| 9,747,901 B1 | 8/2017 | Gentry | |
| 9,777,502 B2 | 10/2017 | Curlander | |
| 9,801,517 B2 | 10/2017 | High | |
| 9,873,408 B2 | 1/2018 | Capizzo | |
| 10,131,451 B2 | 11/2018 | Salgueiro | |
| 10,139,817 B2 | 11/2018 | High | |
| 10,198,708 B2 | 2/2019 | Mattingly | |
| 10,293,938 B2 | 5/2019 | Thompson | |
| 10,351,239 B2 | 7/2019 | Di Benedetto | |
| 10,403,155 B2 | 9/2019 | Kimchi | |
| 10,405,198 B2 | 9/2019 | Carpenter | |
| 10,486,883 B2 | 11/2019 | Winkle | |
| 10,514,690 B1 | 12/2019 | Siegel | |
| 10,515,555 B2 | 12/2019 | High | |
| 10,538,327 B2* | 1/2020 | High | G05D 1/0011 |
| 10,600,020 B2 | 3/2020 | Stenneth | |
| 10,614,503 B2 | 4/2020 | High | |
| 10,807,714 B2 | 10/2020 | Atchley | |
| 10,810,501 B1* | 10/2020 | Kimchi | G06N 20/00 |
| 10,874,240 B2 | 12/2020 | Lewis | |
| 11,053,021 B2 | 7/2021 | Di Benedetto | |
| 11,066,186 B2 | 7/2021 | Walsh | |
| 11,142,447 B2* | 10/2021 | Rainville | B67D 7/0401 |
| 11,148,805 B2* | 10/2021 | Cooper | B64F 1/222 |
| 11,222,300 B2* | 1/2022 | Robinson | G08G 5/025 |
| 11,237,559 B2* | 2/2022 | Christian | G05D 1/101 |
| 11,440,679 B2* | 9/2022 | Cowden | B64U 50/34 |
| 11,453,514 B2* | 9/2022 | Rainville | B64U 50/00 |
| 11,475,778 B1* | 10/2022 | Kaneria | G06Q 10/0832 |
| 11,499,680 B2* | 11/2022 | Creusen | F21V 33/00 |
| 2004/0135031 A1 | 7/2004 | Stupakis | |
| 2010/0004802 A1 | 1/2010 | Bodin | |
| 2014/0032034 A1 | 1/2014 | Raptopoulos | |
| 2015/0336669 A1 | 11/2015 | Kantor | |
| 2016/0033966 A1 | 2/2016 | Farris | |
| 2016/0189101 A1 | 6/2016 | Kantor | |
| 2016/0307447 A1 | 10/2016 | Johnson | |
| 2016/0307449 A1 | 10/2016 | Gordon | |
| 2017/0011333 A1 | 1/2017 | Greiner | |
| 2017/0073085 A1* | 3/2017 | Tremblay | B64F 1/125 |
| 2017/0313421 A1* | 11/2017 | Gil | G06Q 10/0832 |
| 2017/0369184 A1 | 12/2017 | Di Benedetto | |
| 2018/0111683 A1* | 4/2018 | Di Benedetto | G06Q 10/083 |
| 2018/0155011 A1 | 6/2018 | Greiner | |
| 2018/0175349 A1 | 6/2018 | Hummer | |
| 2018/0215546 A1 | 8/2018 | High | |
| 2018/0251234 A1 | 9/2018 | Wang | |
| 2018/0312069 A1* | 11/2018 | McClymond | B60L 53/51 |
| 2018/0319494 A1 | 11/2018 | Aflatoon | |
| 2018/0352988 A1* | 12/2018 | Ortiz | A47G 29/141 |
| 2018/0357910 A1* | 12/2018 | Hobbs | B64C 27/00 |
| 2018/0364740 A1 | 12/2018 | Collins | |
| 2019/0012631 A1 | 1/2019 | Chatani | |
| 2019/0012636 A1 | 1/2019 | Simon | |
| 2019/0079509 A1 | 3/2019 | Bosworth | |
| 2019/0112049 A1 | 4/2019 | Phan | |
| 2019/0130770 A1 | 5/2019 | Di Benedetto | |
| 2019/0161190 A1* | 5/2019 | Gil | B65G 1/0435 |
| 2019/0180237 A1 | 6/2019 | Mattingly | |
| 2019/0197643 A1 | 6/2019 | Cochran | |
| 2019/0197646 A1 | 6/2019 | Prager | |
| 2019/0248509 A1 | 8/2019 | Cohen | |
| 2019/0299802 A1 | 10/2019 | Neubecker | |
| 2019/0300202 A1 | 10/2019 | High | |
| 2019/0340569 A1 | 11/2019 | Prager | |
| 2019/0375504 A1* | 12/2019 | Schmalzried | B64D 1/22 |
| 2019/0389577 A1 | 12/2019 | Jones | |
| 2020/0017218 A1* | 1/2020 | Ahmad | B64C 39/024 |
| 2020/0017237 A1 | 1/2020 | Walker | |
| 2020/0175471 A1 | 6/2020 | Tsuruta | |
| 2020/0407079 A1* | 12/2020 | Kim | H02J 7/35 |
| 2021/0114729 A1 | 4/2021 | Ragan | B64C 1/22 |
| 2021/0224739 A1* | 7/2021 | Sweeny | G06Q 10/0838 |
| 2021/0253251 A1* | 8/2021 | Pass | B64D 1/22 |
| 2021/0380244 A1* | 12/2021 | Leverman | B64D 9/00 |
| 2021/0394930 A1* | 12/2021 | O'Toole | B60L 53/80 |
| 2022/0119105 A1* | 4/2022 | Schmalzried | B64F 1/00 |
| 2023/0074283 A1* | 3/2023 | Malcolm | G07C 9/00182 |

FOREIGN PATENT DOCUMENTS

| | | | | |
|---|---|---|---|---|
| WO | 2017214669 A1 | 12/2017 | | |
| WO | WO-2018057034 A1 * | 3/2018 | | B64C 39/024 |
| WO | WO-2018071943 A1 * | 4/2018 | | A47G 29/12 |
| WO | WO-2019055690 A1 * | 3/2019 | | B64C 27/08 |
| WO | WO-2019210407 A1 * | 11/2019 | | B64C 1/22 |

* cited by examiner

SYSTEMS AND METHODS FOR PACKAGE DELIVERY WITH UNMANNED AERIAL VEHICLES

FIELD

The present disclosure generally relates to package delivery systems, and more particularly to package delivery systems using unmanned aerial vehicles (UAVs) to deliver packages.

BACKGROUND

Packages are used to deliver items to businesses and residences throughout the world. One such item frequently delivered in packages to consumers are pharmaceutical containers containing pharmaceuticals. Conventionally, these packages are delivered to businesses and residences using land based vehicles, such as trucks, but the development of aerial based delivery vehicles, such as drones, unmanned aerial vehicles (UAVs), etc., has opened up other delivery methods.

SUMMARY

In one aspect, a package delivery system for delivering a plurality of packages with one or more UAVs comprises a package receptacle configured to receive and store the plurality of packages. A charging station is configured to charge a plurality of UAV batteries which power the one or more UAVs. A UAV landing pad is sized and shaped to permit at least one of the one or more UAVs to land thereon. A loader is configured to load at least one of a package of the plurality of packages or a UAV battery of the plurality of UAV batteries onto one of the one or more UAVs when said one UAV is on the UAV landing pad. A transporter is configured to move at least one of said packages of the plurality of packages or said UAV battery of the plurality of UAV batteries toward the loader.

In another aspect, a method for delivering a plurality of packages with one or more UAVs comprises delivering, with a transporter, a package of the plurality of packages to a loader; delivering a charged UAV battery to the loader; loading, with the loader, said package on one UAV of the one or more UAVs; loading, with the loader, said charged UAV battery on said one UAV; and delivering, with said one UAV, said package to a delivery location.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
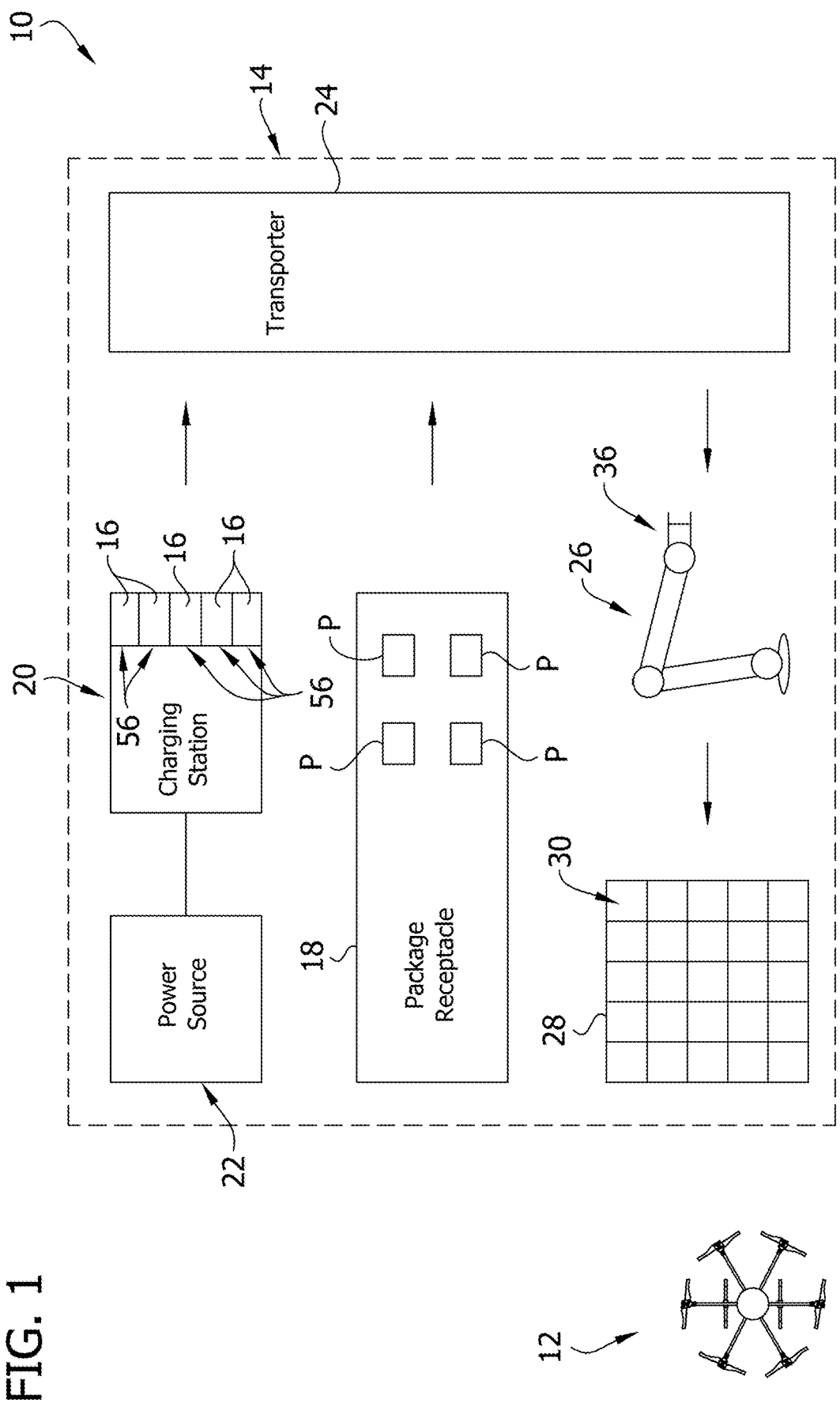
FIG. 1 is a schematic diagram of a package delivery system according to one embodiment of the present disclosure.

Referring to the drawings, FIG. 1 illustrates a package delivery system embodying aspects of the present disclosure, indicated generally by reference numeral 10. Specifically, the package delivery system 10 is a UAV package delivery system and includes one or more UAVs 12 (broadly, carriers) to deliver one or more (e.g., a plurality of) packages P to delivery destinations or locations, such as buildings or residences. The package delivery system 10 may be used to deliver any type of package P, such as a package containing one or more pharmaceuticals.

The package delivery system 10 includes a UAV station 14 configured to receive and deploy the UAVs 12 to deliver the packages P. The UAV station 14 generally interacts with the UAVs 12 to deliver the packages P. As described in more detail below, the UAV station 14 is configured to load the UAVs 12 with the packages P and to replace a discharged (e.g., partially discharged) or dead battery 16 of each UAV 12 with a charged (e.g., fully or nearly fully charged) battery. By replacing a battery 16 approaching a discharged state with a charged battery, the UAV 12 is able to be used continuously without being taken out of service to charge its battery, which could take several hours. In one example, a fully charged battery 16 may only be able to supply enough power for about two deliveries. By swapping out the dead batteries 16 with charged batteries, the UAVs are able to operate all day, without large amounts of down time, as would be the case if a UAV had to wait for its battery to be recharged. The battery 16 of the UAV 12 is, desirably, a cartridge type battery that can be easily removed from and loaded onto the UAV.

In one embodiment, the UAV 12 is a helicopter type UAV, such as a single rotor or multi-rotor type UAV. Other types of UAV's 12, such as fixed wing UAVs and/or fixed-wing hybrid UAVs, are within the scope of the present disclosure. In the illustrated embodiment, the UAV 12 is a multi-rotor type UAV. Each UAV 12 is generally autonomous and can deliver one or more packages P with little to no user control or input. Accordingly, each UAV 12 is a smart UAV that can avoid obstacles, fly to coordinates and delivery the package P on its own, after the UAV receives the package from the UAV station 14. One example of a suitable UAV 12 is the H520 hexacopter UAV sold by YUNEEC. Further details of the UAV 12 are described below.

Referring to FIGS. 1-6, the UAV station 14 may include a package receptacle 18, a charging station 20, a power source 22, a transporter 24, a loader 26 and a UAV landing pad 28. The package receptacle 18 is configured to receive and store the plurality of packages P. Specifically, the package receptacle 18 holds the packages P until the packages are loaded onto a UAV 12. The package receptacle 18 may be any suitable device able to store and hold the packages P in an organized manner. For example, the package receptacle 18 may include one or more shelves, racks, containers, bins, cabinets, conveyor and/or holders.

Other configurations of the package receptacle 18 are within the scope of the present disclosure. The packages P may be randomly placed or organized in the package receptacle 18. For example, the packages P can be organized in the package receptacle 18 in an order to be delivered.

The UAV landing pad 28 is sized and shaped to permit at least one of the one or more UAVs 12 to land thereon. The UAV landing pad 28 may be sized and shaped to receive multiple UAVs 12, such as two, three, four or more UAVs. The UAV landing pad 28 defines a generally planar landing surface for the UAVs 12 to land on. The UAV station 14 can have multiple UAV landing pads 28. For example, the UAV station 14 can include two, three, four or more UAV landing pads 28. As explained in more detail below, the UAVs 12 receive packages P when the UAVs are on the UAV landing pads 28. The UAVs 12 may also have their batteries 16 replaced when the UAVs are disposed on the UAV landing pads 28. In one embodiment, the UAV landing pad 28 may be covered, such as by a hangar (not shown), to protect the UAVs 12 from the weather, such as wind and rain. The hanger may include a door, such as garage or trap door, to permit the UAV 12 to enter and leave the hanger as the UAV is landing or taking off from the UAV landing pad 28, respectively. The UAV 12 may communicate with a door controller to signal the door controller to open the hanger door when the UAV approaches the door. The hanger, or more broadly the UAV station 14, can be positioned on or integrated into a pharmacy (e.g., a retail pharmacy or an automated pharmacy).

Figure 3:
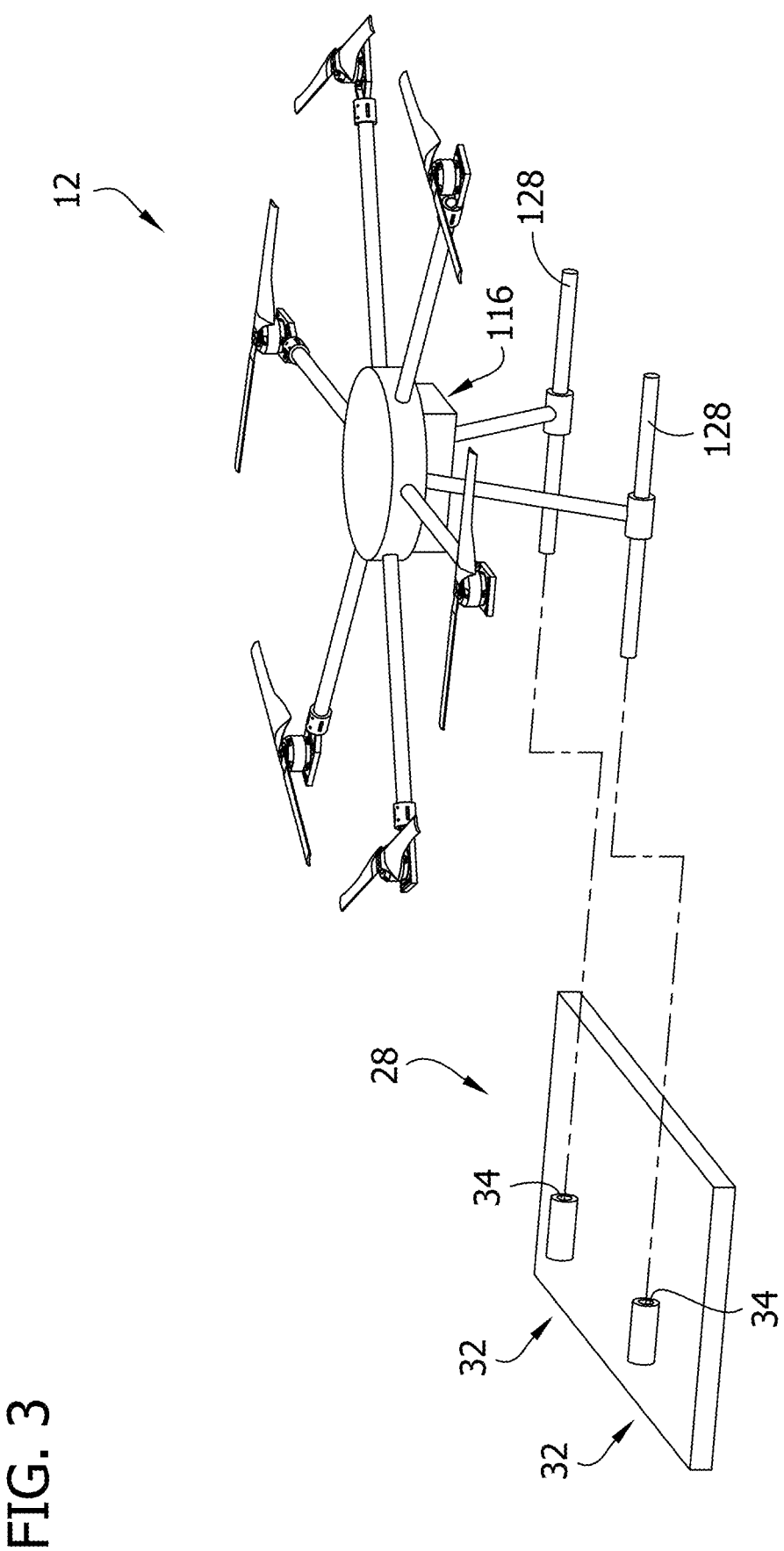
FIG. 3 is a perspective of one embodiment of a UAV landing pad of the package delivery system.
Figure 4:
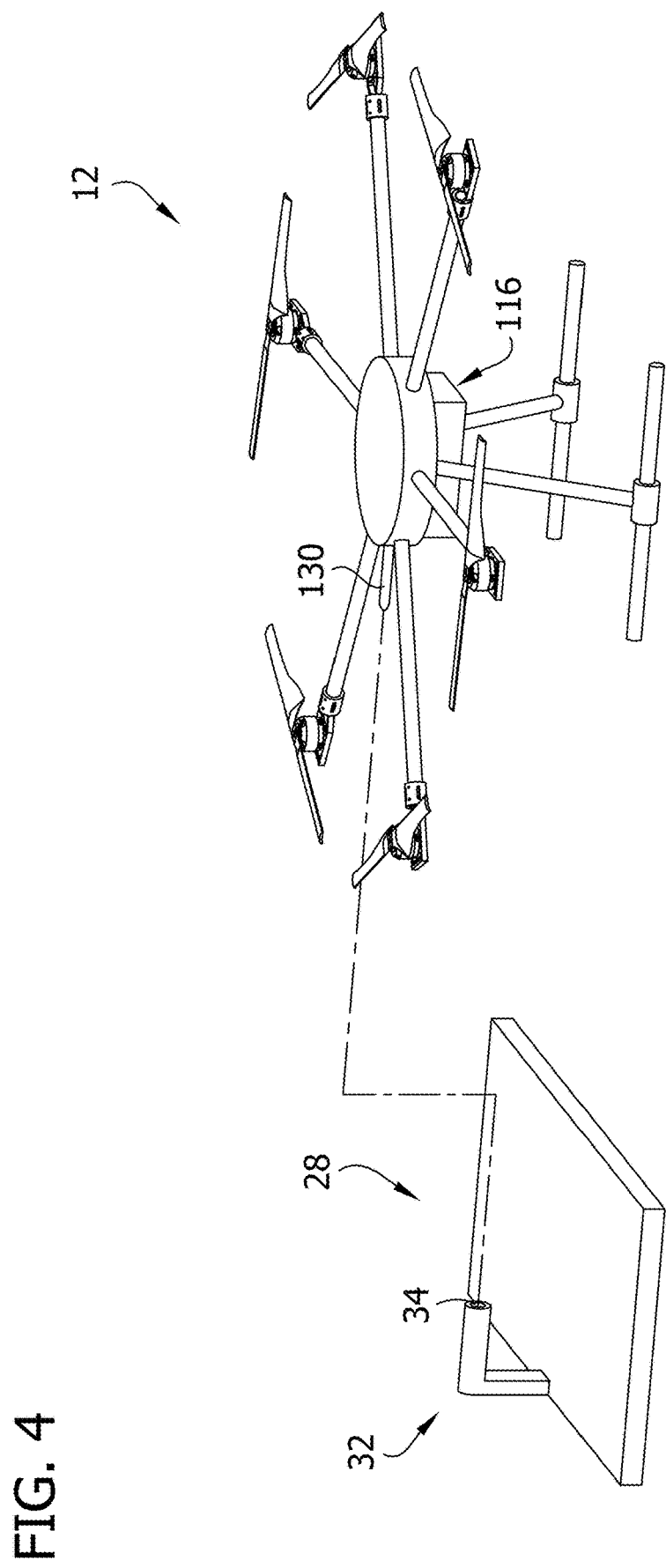
FIG. 4 is a perspective of another embodiment of a UAV landing pad of the package delivery system.

Referring to FIGS. 3 and 4, the UAV landing pad 28 may include a UAV holder 32 (broadly, at least one UAV holder) configured to hold and position the UAV 12 on the UAV landing pad. The UAV holder 32 defines a receiving space 34 sized and shaped to receive a portion of the UAV 12 to hold and position the UAV on the UAV landing pad 28. Different types of UAV holders 32 are within the scope of the present disclosure. For example, referring to FIG. 3, the UAV holder 32 in this embodiment comprises a cylinder configured to receive a skid 128 of the UAV 12. In other embodiments, the UAV holder 32 may comprise a cone. In another example shown in FIG. 4, the UAV holder 32 includes a dock configured to receive a horn or antenna 130 of the UAV 12. In another embodiment, the UAV holder 32 may include one or more magnets (such as electromagnets) in the UAV landing pad 28 that magnetically couple to the UAV 12 to secure and/or position the UAV on the landing pad. In an example embodiment, the pad 28 includes magnets at the location thereon where the skids, feet or other component of the UAV 12 contact the surface of the pad. In an example embodiment, the entire surface of the pad 28 is magnetized. The magnets can act as the holder to hold the UAV 12 in position on the pad 28. By positioning and holding the UAV 12 on the UAV landing pad 28 with the UAV holder 32, the UAV will be located in a predetermined position on the landing pad to receive a package P and/or have one or more batteries 16 replaced, as described in more detail below. The UAV holder 32 also helps to stabilize the UAV 12 on the landing pad 28 and helps to prevent the UAV from falling off the UAV landing pad.

Figure 2:
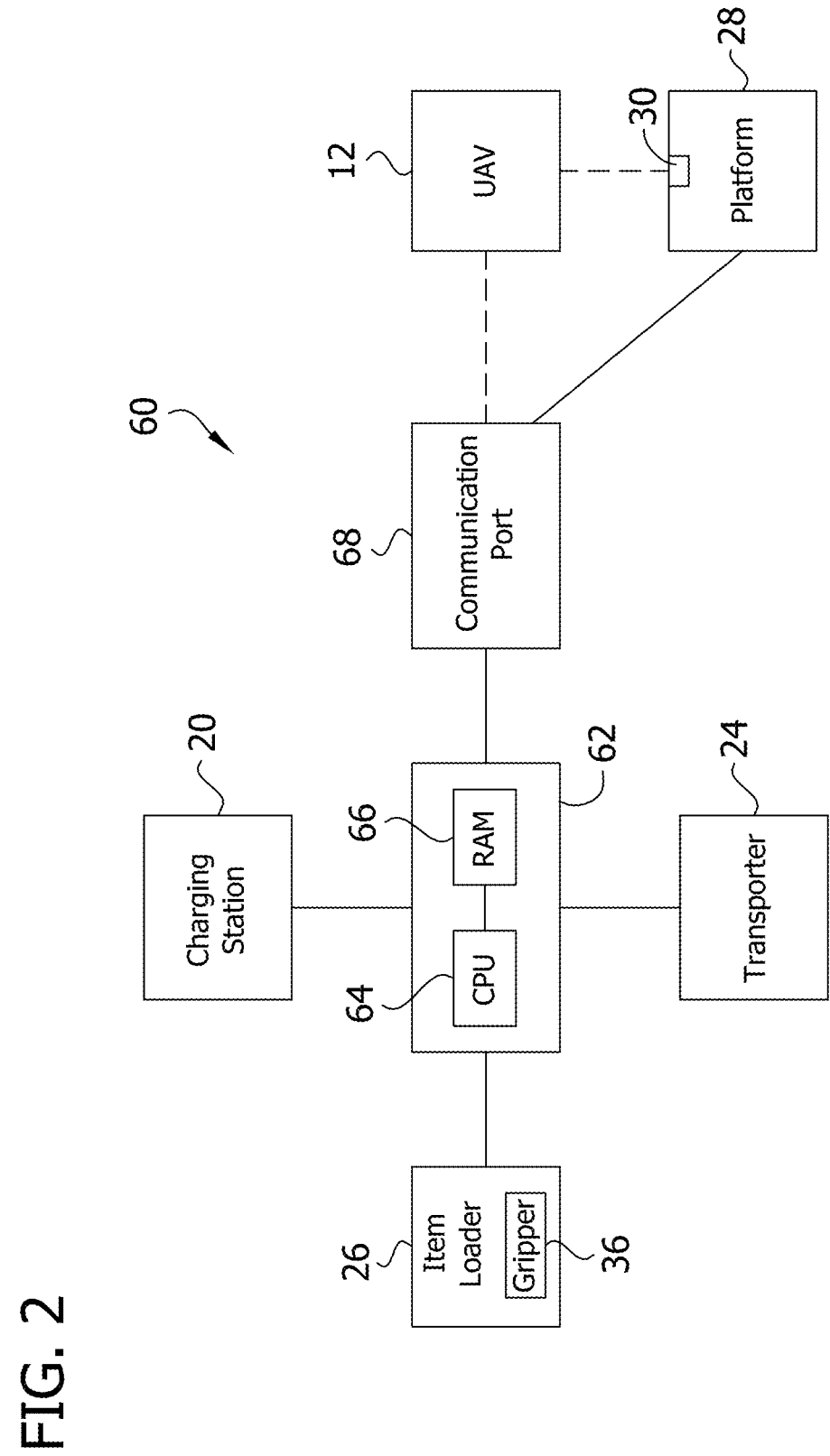
FIG. 2 is a schematic diagram of an exemplary control system for the package delivery system.

Referring to FIGS. 1 and 2, the UAV landing pad 28 may be configured to facilitate landing of the UAV 12 thereon. Specifically, the UAV landing pad 28 may include a landing target 30 that interacts with the UAV 12, and in particular the landing pad locator 110 to help position the UAV on the UAV landing pad. The landing pad locator 110 of the UAV 12 is discussed in more detail below, but is able to determine the position of the UAV with respect to the UAV landing pad 28. In one embodiment, the landing pad locator 110 may interact with the landing target 30 to determine the position of the UAV 12 relative to the UAV landing pad 28.

Referring to FIG. 1, in one embodiment of the UAV landing pad 28, the landing target 30 is a graphic (broadly, an image, pattern or graphic design) that is configured to be identified and understood (e.g., analyzed) by the landing pad locator 110. In one embodiment, the graphic 30 is a machine-readable graphic such as, but not limited to, a linear (e.g., one dimensional) barcode, a matrix barcode (e.g., a two dimensional barcode, a quick response (QR) code, etc.), or the like. In the illustrated embodiment, the graphic 30 is a grid (FIG. 1). The graphic 30 serves as a reference point for the UAV 12 to allow the UAV to determine its position relative to the UAV landing pad 28 by scanning (e.g., imaging) the graphic using the landing pad locator 110.

Referring to FIG. 2, in another embodiment of the UAV landing pad 28, the landing target 30 is a near field communication (NFC) tag (broadly, a landing location tag) and the landing pad locator 110 is configured to communicate, using NFC, with the NFC tag to determine the position of the UAV landing pad 28 relative to the UAV 12.

Figure 5:
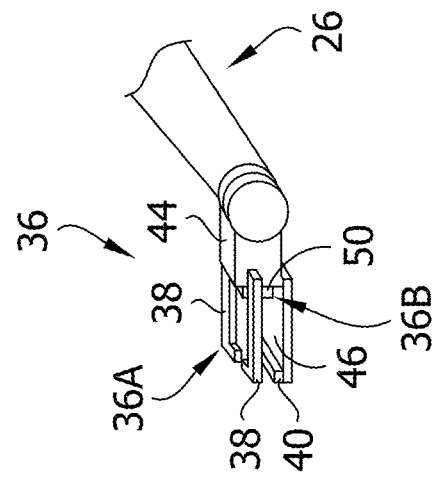
FIG. 5 is a fragmentary perspective of a UAV, a UAV landing pad and a loader of the package delivery system.
Figure 5:
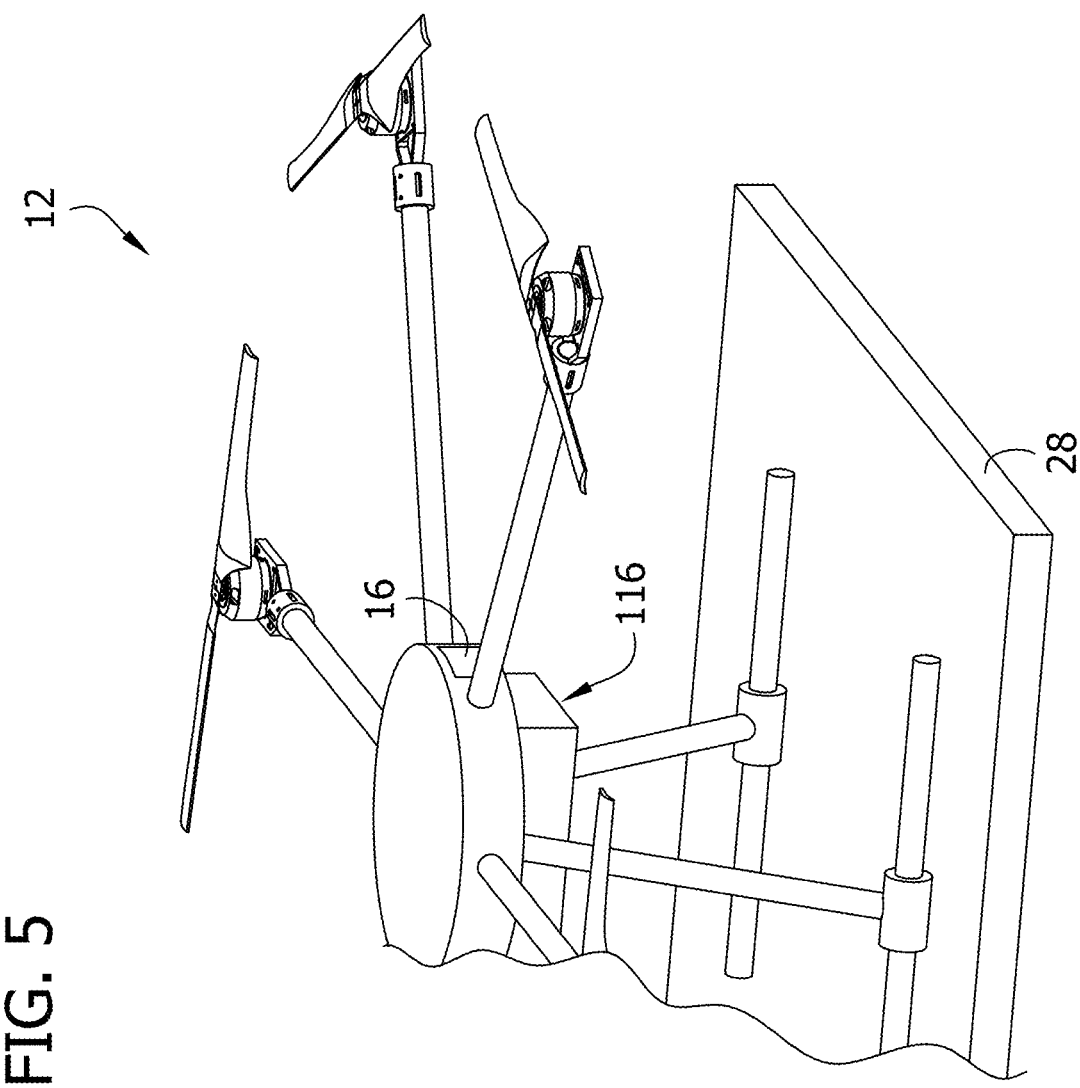
Figure 6:
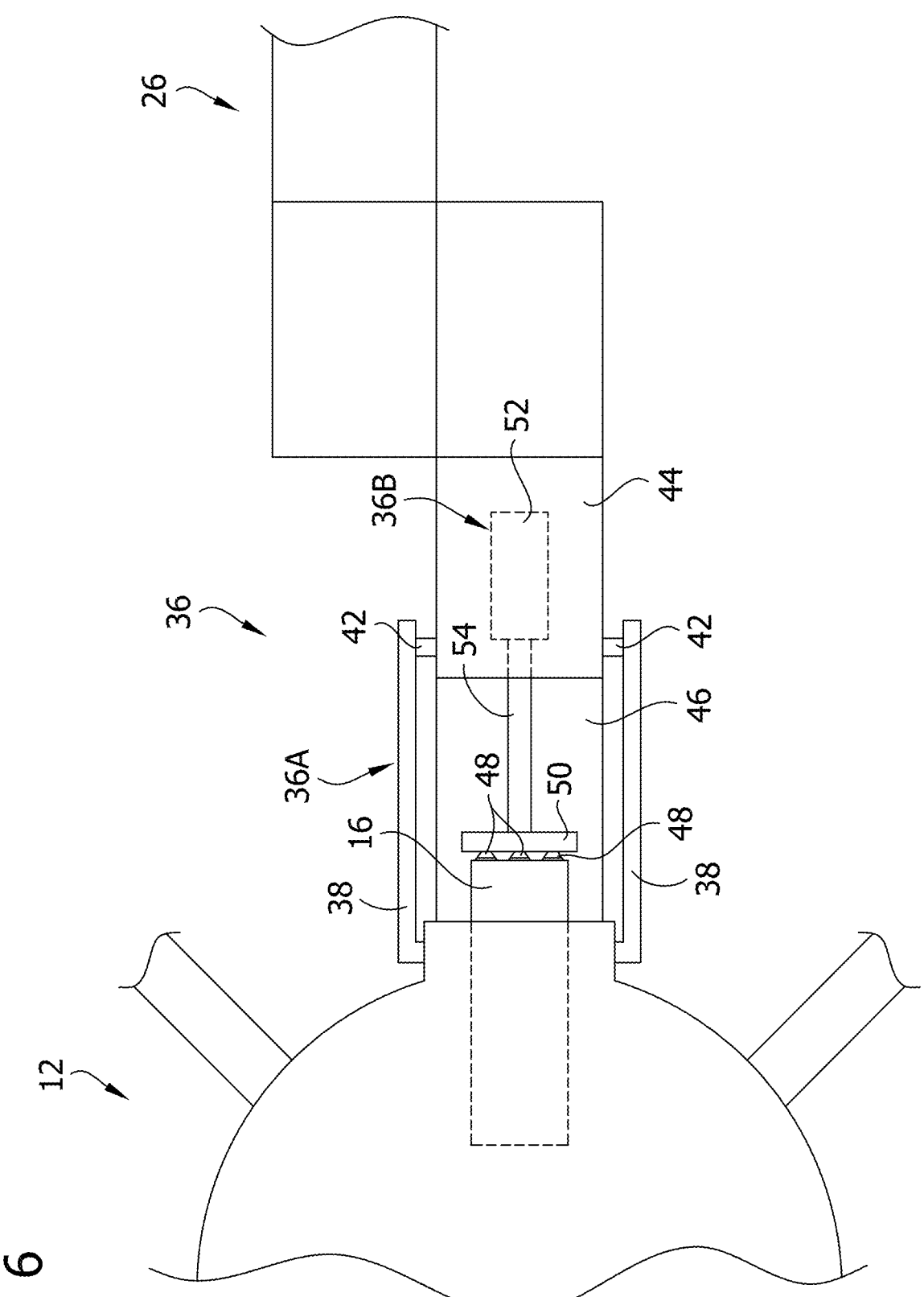
FIG. 6 is a fragmentary top view of the loader removing a UAV battery from the UAV.

Referring to FIGS. 1, 5 and 6, the loader 26 of the UAV station 14 is configured to load at least one of a package P or a UAV battery 16 onto a UAV 12 when the UAV is disposed on the UAV landing pad 28. In one embodiment, the loader 26 is configured to load both the package P and UAV battery 16 onto the UAV 12. Specifically, the loader 26 is able to give (e.g., place, insert, hand off) one or more packages P to a package holder 112, described in more detail below, of the UAV 12 and/or replace a battery 16 in the UAV 12 with a charged battery. As explained in more detail below, the loader 26 can also transfer the UAV battery 16 taken from the UAV 12 to the charging station 20 or to the transporter 24. In one embodiment, the UAV station 14 may include two loaders 26, one for packages P and one for UAV batteries 16. In the illustrated embodiment, the loader 26 is a robot such as a six-axis robotic arm, a selective-compliance-articulated robotic arm, a cylindrical robot, a delta robot, a polar coordinate robot, a vertically articulated robot, a Cartesian coordinate robot or any other suitable device. Other types of loaders are within the scope of the present disclosure. The UAV station 14 may include multiple (e.g., two, three, four or more) loaders 26. Generally, each UAV landing pad 28 will have a corresponding loader 26 (or two loaders, one for the UAV battery 16 and the other for the package P). Accordingly, if the UAV station 14 has three UAV landing pads 28, the UAV station will also have three (or six) loaders 26 corresponding to each UAV landing pad.

The loader 26 includes a gripper 36 (broadly, at least one gripper) configured to grab and hold at least one of the package P or the UAV battery 16. By grabbing the UAV battery 16 via the gripper 36, the loader 26 can remove the UAV battery from the UAV 12 and attach (e.g., insert) a UAV battery (e.g., a charged battery). Similarly, by grabbing the package P via the gripper 36, the loader 26 can place or hand off the package to the UAV 12. The loader 26 is configured to place or hand off the package P to the package holder 112 of the UAV 12. In one embodiment, the gripper 36 is configured to grab and hold either the package P or the UAV battery 16. In one embodiment, the gripper 36 is configured to hold both the package P and the UAV battery 16. The gripper 36 may include any suitable device for selectively grabbing and releasing an item such as a claw, gripper fingers, suction cups, etc. Generally, the gripper 36 may include a prime mover to move the gripper between grab and release positions. The prime mover may be a motor (e.g., an electric motor), a servo, a pancake actuator, a linear actuator, or any other suitable device.

In another embodiment, the gripper 36 may be configured to grab the UAV 12 so that when is on the UAV landing pad 28, the loader 26 can hold the UAV in place. In one embodiment, loader 26 may include multiple grippers 36. In this case, each gripper 36 may be configured to grab a specific element. For example, in the embodiment shown in FIGS. 5 and 6, the loader 26 includes a first gripper 36A configured to grip the UAV 12 and a second gripper 36B configured to grip the UAV battery 16. In this embodiment, the first or UAV gripper 36A may include opposite left and right fingers 38 configured to grab (e.g., engage) opposite side surfaces of the UAV 12 and a lip 40 configured to grab (e.g., engage) a lower surface of the UAV. Pancake actuators 42 (broadly, prime movers) connect the left and right fingers 38, respectively, to a head 44 of the loader 26. The pancake actuators 42 can move the left and right fingers 38 outward (e.g., away from one another) and inward (e.g., toward one another) to release or grab, respectively, the UAV 12. Another pancake actuator (not shown) may be disposed between the lip 40 and a platform 46 to raise and lower the lip 40 (relative to the platform) to grab or release, respectively, the UAV 12. Other configurations of the UAV gripper 36A are within the scope of the present disclosure.

Still referring to FIGS. 5 and 6, the second or UAV battery gripper 36B may include one or more suction cups 48 configured to grip the UAV battery 16. In the illustrated embodiment, the UAV battery gripper 36B includes three suction cups 48, although more or fewer suction cups are within the scope of the present disclosure. The suction cups 48 are fluidly connected to a source of negative pressure (not shown), such as a vacuum. By activating and deactivating the source of negative pressure, the suctions cups 48 can grip and release, respectively, the UAV battery 16. The suction cups 48 are mounted on a suction head 50, which is operatively connected to a linear actuator 52 with a piston 54. The linear actuator 52 drives linear or longitudinal movement of the suction head 50, which moves the suction head between extended and retracted positions. In the extended position, the suction head 50 is positioned such that the suction cups 48 engage the UAV battery 16 when the battery is attached to the UAV 12 (and when the UAV gripper 36A is gripping the UAV). In the retracted position (FIG. 5), the suction head 50 is positioned such that the UAV battery 16 is completely removed from the UAV 12. Accordingly, by gripping the UAV battery 16 with the suction cups 48, the UAV battery gripper 36B can remove the battery from the UAV 12 by moving from the extended position to the retracted position, thereby sliding the battery out of the UAV. Likewise, the UAV battery gripper 36B can insert a UAV battery 16 into the UAV 12 by moving the suction cups 48 from the retracted position to the extended position, thereby sliding the battery into the UAV. As explained in more detail below, UAV battery gripper 36B can also load the UAV battery 16 into the charging station 20 or onto the transporter 24 by moving the suction cups 48 from the retracted position to the extended position. The platform 46 may help support the UAV battery 16 when the battery is in the retracted position or being moved to or from the retracted position.

Referring back to FIG. 1, the charging station 20 of the UAV station 14 is configured to charge a plurality of UAV batteries 16. The charging station 20 recharges the UAV batteries 16 (once they are removed from the UAVs 12 via the loader 26) and supplies charged UAV batteries to the UAVs 12. The charging station 20 can include a plurality of charging ports 56 that receive and charge a UAV battery 16. In the illustrated embodiment, the transporter 24 is used to carry the UAV batteries 16 between the charging station 20 and the loader 26. In this embodiment, a pick and place robot (not shown), such as a six-axis robotic arm, a selective-compliance-articulated robotic arm, a cylindrical robot, a delta robot, a polar coordinate robot, a vertically articulated robot, a Cartesian coordinate robot or any other suitable device, may be used to transfer the UAV batteries 16 between the charging station 20 and the transporter 24.

In another embodiment, the loader 26 may insert and receive the UAV batteries 16 directly from the charging station 20. For example, in one embodiment, the charging ports 56 may have a magazine arrangement. In this configuration, the charging ports 56 are generally oriented vertically, with the fully charged or more fully charged UAV batteries 16 located at the upper end of the magazine and the dead or less charged UAV batteries 16 located at the bottom of the magazine. The magazine is generally disposed next to or within the reach of the loader 26. When a UAV 12 needs a new (e.g., charged) UAV battery 16, the loader 26 inserts the dead battery (taken from the UAV) into the charging port 56 at the bottom of the magazine and then grabs the top most battery from the charging port at the top of the magazine. When the top most battery 16 in the magazine is taken, the batteries (and corresponding charging ports 56) automatically move upward (via a spring or a prime mover), thereby positioning the next battery at the top of the magazine to be taken by the loader 26 and an empty charging port at the bottom of the magazine to receive a dead battery from the loader. As the batteries 16 travel upward in the magazine, the batteries are charged by the charging ports 56. Other configurations of the charging station 20 are within the scope of the present disclosure. For example, the batteries may move downward (e.g., via gravity) to a pickup location in the magazine charger instead of moving upward. In one embodiment, the charging ports 56 of the charging station 20 may be stationary (e.g., not in a magazine arrangement). In this embodiment, the battery 16 with the greatest amount of charge is removed from the charging station 20 and loaded into the UAV 12. A controller in the charging station 20 can track the level of charge of each battery 16 being charged by the station. The battery 16 with the greatest amount of charge may be determined directly by the charging station 20 (or some other component of the UAV station 14) or estimated based on the length of time the batteries have been charging (e.g., the greater the length of time the greater the charge). In this embodiment, the locations of each battery 16 in the various charging ports 56 would be tracked in order be able to select the battery with the greatest amount of charge. With the batteries 16 being stored in stationary charging ports 56, the loader 26 may require a greater range of motion and a greater dexterity relative to the magazine embodiment in order to reach each stationary charging port.

The UAV station 14 includes a power source 22 to provide electrical power to charge the UAV batteries 16. The power source 22 can include a battery, a generator, a turbine, solar panels, a utility grid connection to connect to utility (e.g., electric) grid and/or any other suitable source.

In another embodiment, the a charging cable (not shown) is connected to the power source 22 and configured to electrically couple to the UAV 12 when the UAV is on the UAV landing pad 28 to charge the battery 16 of the UAV. This way, the battery 16 in the UAV 12 does not have to be replaced, but simply recharged while the UAV is on the UAV landing pad 28. The charging cable may be mounted on the loader 26 such that the loader can releasably couple the charging cable to the UAV 12 on the UAV landing pad 28. The charging cable may be in addition to or in place of the charging station 20. In one embodiment, an inductive charger (e.g., wireless charger) can be used to wirelessly charge the UAV 12 while the UAV is on the UAV landing pad 28. The inductive charger (not shown) may be part of the UAV landing pad 28 or the loader 26. This embodiment may be used with the UAV 12 is not scheduled for a further delivery and has time for its battery 16 to recharge while it is waiting to be scheduled for an additional delivery.

In one embodiment, the UAV station 14 is mobile. The UAV station 14 (e.g., the components thereof) can be mounted on (e.g., support by) a vehicle (not shown), such as a delivery truck. In this embodiment, the power source 22 can be the vehicle's battery and/or one or more solar panels mounted on the vehicle. In another embodiment, the UAV station 14 is stationary and remains in one place. For example, the UAV station 14 can be placed on a top of a building and be used to delivery packages P from the building. In one exemplary configuration, the building may be a pharmacy and the UAV station 14 can be used to deliver a pharmaceutical package P containing a patient's prescription from the pharmacy to a delivery destination (e.g., residence) of the patient. In this embodiment, the power source 22 can comprise the utility grid and/or one or more solar panels mounted on the building.

Still referring to FIG. 1, the transporter 24 of the UAV station 14 is configured to move at least one of the package P or the UAV battery 16 toward the loader 26. Specifically, the transporter 24 is configured to deliver at least one of the package P or the UAV battery 16 to the loader 26, which then grabs and delivers the package or UAV battery to the UAV 12. The transporter 24 receives the packages P from the package receptacle 18 and then moves the packages to the loader 26. In one embodiment, a human operator manually transfers the packages P from the package receptacle 18 to the transporter 24. In another embodiment, a packages P are automatically moved from the package receptacle 18 to the transporter 24 by a pick and place robot (not shown), as described above, or a conveyor (not shown). Once loaded on the transporter 24, the transporter carries the packages P to the loader 26. The transporter 24 (broadly, a transporter assembly) may include at least one conveyor, an elevator and/or a robotic arm to move the package P and/or UAV battery 16 toward the loader 26. For example, in one embodiment, the transporter 24 includes a conveyor (not shown) which receives a package P from the package receptacle 18 and an elevator (not shown) which receive the package from the conveyor and lifts the package to the loader 26. Other configurations of the transporter 24 are within the scope of the present disclosure. For example, the transporter 24 may include multiple conveyors, elevators and/or robotic arms.

The transporter 24 can also be used to move or transport the UAV battery 16. The transporter 24 may receive a UAV battery 16 from the charging station 20 and deliver the UAV battery to the transporter. In addition, the transporter 24 may also receive and carry a UAV battery 16 (e.g., a dead UAV battery) from the loader 26 to the charging station 20.

Referring to FIG. 2, the UAV station 14 has a control system 60 configured to control and operate the UAV station 14. The control system 60 includes a controller 62 having a CPU or processor 64 and RAM or memory 66 (broadly, non-transitory computer-readable storage medium). The controller 62 provides the computing engine that drives the operation of the UAV station 14. Broadly, the memory 66 includes (e.g., stores) processor-executable instructions for controlling the operation of the processor 64. The instructions embody one or more functional aspects of the UAV station 14 and its components, with the processor 64 executing the instructions to perform said one or more functional aspects.

The controller 62 is communicatively coupled to the various components of the UAV station 14, such as the transporter 24, the charging station 20 and the loader 26, to control and/or operate these components. For example, the controller 62 can operate the transporter 24 and loader 26 to move a package P from the package receptacle 18 to the UAV 12. The controller 62 can include a communication port 68, such as a wireless communication port, to communicate with other devices, such as the UAV 12. The communication port 68 can include an infrared (IR) port, a hardwire port, a Bluetooth port, a cellular port (e.g., cellular communications broadband network) and/or a Wi-Fi port, and it is understood that various other types of communication ports (e.g., near field communication) can be used without departing from the scope of the present disclosure. For example, the controller 62 can tell the UAV 12 an identity (e.g., serial number) of the package P, recipient information, delivery destination information (e.g., coordinates), and/or any combination thereof. Likewise, the UAV 12 can tell the controller 62, via the communication port 68, the charge level of its battery 16 and/or when the UAV has landed on the UAV landing pad 28. The controller 62 can then use this information to control other components. For example, if the controller 62 determines the charge level of the battery 16 of the UAV 12 is below a threshold level (i.e., the level of charge needed for the drone to be able to make a delivery and return to the UAV station 14), such as 25% charge, the controller 62 can then operate the loader 26 to replace the current battery in the UAV with a fully charged battery from the charging station 20. Likewise, the controller 62 may be in communication with the charging station 20 to ensure the battery 16 being loaded into the UAV 12 has a sufficient charge (e.g., fully or near fully charged). Other types of information can also be shared between the controller 62 and the UAV 12. For example, the controller 62 can send the coordinates (e.g., satellite positioning coordinates) of the UAV station 14 to the UAV 12. In this embodiment, the coordinates of the UAV station 14 may be obtained by a positioning unit (not shown) communicatively coupled to the controller 62. In another example, the controller 62 may instruct the UAV 12 to move the package holder 112, as described in more detail below, to an open or receiving position so that a package P can be loaded onto the UAV.

Figure 7:
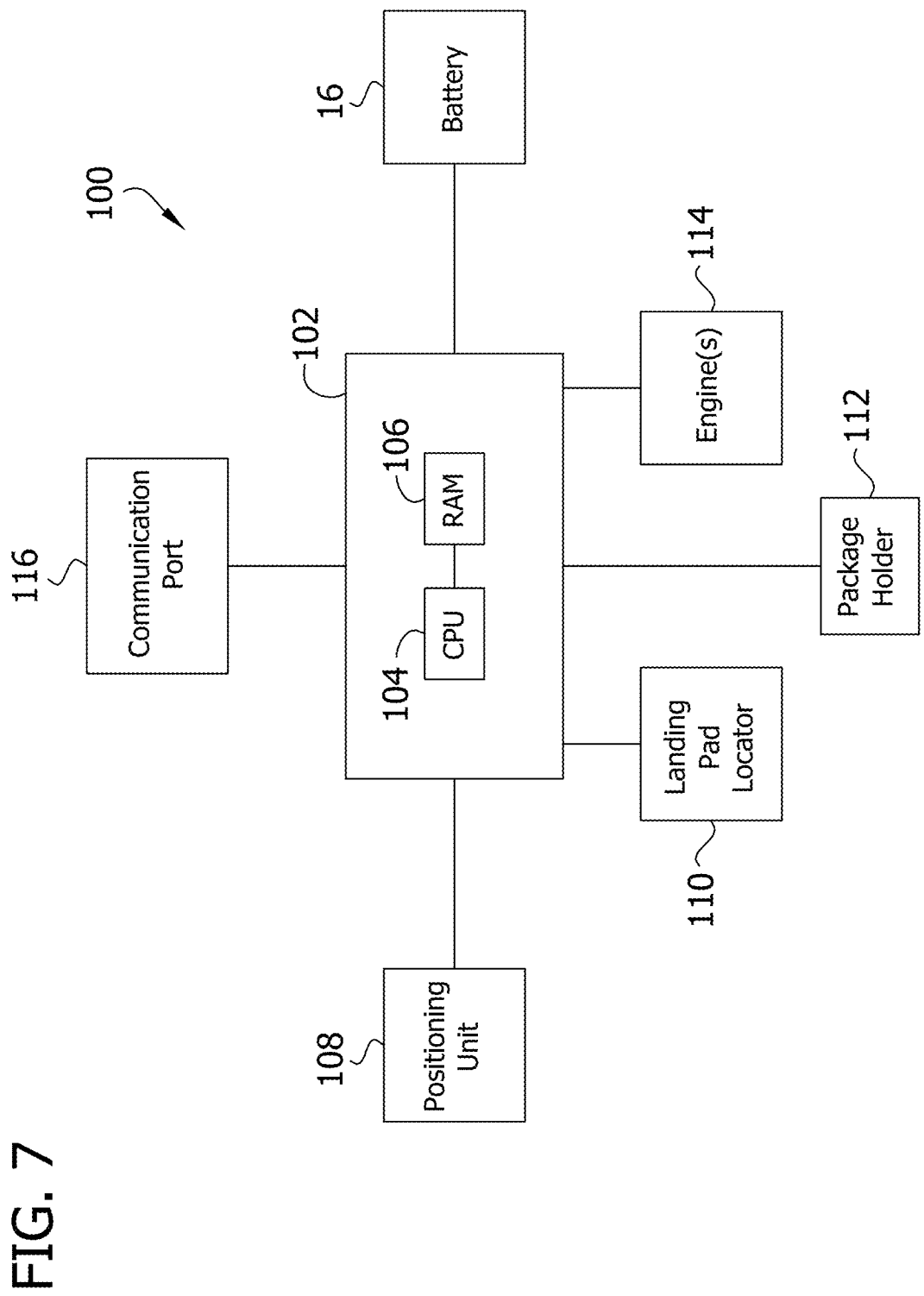
FIG. 7 is a schematic diagram of an exemplary control system for the UAV.

Referring to FIG. 7, further details of the UAVs 12 will now be described. Each UAV 12 has a control system 100 configured to control and operate the UAV. The control system 100 includes a controller 102 having a CPU or processor 104 and RAM or memory 106 (broadly, non-transitory computer-readable storage medium). The controller 102 provides the computing engine that drives the operation of the UAV 12. Broadly, the memory 106 includes (e.g., stores) processor-executable instructions for controlling the operation of the processor 104. The instructions embody one or more functional aspects of the UAV 12 and its components, with the processor 104 executing the instructions to perform said one or more functional aspects. The controller 102 is coupled to the UAV battery 16 (broadly, a power source) which powers the controller and other components of the UAV 12. As mentioned above, the UAV 12 is a smart UAV that can avoid obstacles, fly to coordinates and delivery the package P on its own, after the UAV receives the package from the UAV station 14. Accordingly, the controller 102 may include instructions for executing these functions. In addition, the controller 102 may be configured to (e.g., may include instructions for) detecting emergency situations such as exceeding FAA altitude guidelines, breaching geofence, data link loss, RC loss and/or a low battery. Other emergency situations are within the scope of the present disclosure. If the controller 102 detects an emergency situation, a failsafe action can be executed to correct or address the emergency situation. For example, if the controller 102 detects that the battery 16 is low on charge, relative to the UAV's distance from the UAV landing pad 28 (e.g., an emergency situation), the controller 102 can execute a return to UAV station action (e.g., a failsafe action) and return to the closest UAV station 14.

The UAV 12 also includes a positioning unit 108, a landing pad locator 110, a package holder 112 and one or more engines 114 (e.g., electric motors operatively coupled to propellers). The controller 102 is communicatively coupled to these components. For example, the one or more engines 114 are controlled by the controller 102 to drive movement of the UAV 12. The positioning unit 108 is configured to provide positional information (e.g., coordinates, satellite navigation coordinates) of the UAV 12 to the controller 102. For example, the positioning unit 108 may be a GPS unit that provides the GPS coordinates for the UAV 12.

The landing pad locator 110 is configured to assist the UAV 12 in landing on the UAV station 14, specifically the UAV landing pad 28. In particular, the landing pad locator 110 is configured to determine the position of the UAV 12 with respect to the UAV landing pad 28. The landing pad locator 110 is used to land the UAV 12 on the UAV landing pad 28 after the controller 102 uses the positioning unit 108 to get relatively close to the UAV station 14 and UAV landing pad (i.e., the controller 102 knows the coordinates of the UAV station and uses the positioning unit to navigate the UAV to the coordinates). Generally speaking, the positioning unit 108, which uses satellite navigation coordinates such as GPS coordinates, may only be accurate to about ten feet. While this is able to get the UAV 12 in the general location of the UAV landing pad 28 (e.g., within about ten feet), it is not accurate enough to pinpoint the exact location of the UAV landing pad (which may only be about three feet wide by about three feet long), even though the controller 102 knows the satellite navigation coordinates of the UAV landing pad. Accordingly, the UAV 12 uses the positioning unit 108 to get close to the UAV landing pad 28 and then uses the landing pad locator 110 to determine the exact position of the UAV landing pad. This enables the UAV 12 to land on the UAV landing pad 28.

In one embodiment, the landing pad locator 110 includes at least one camera (broadly, an imaging system) configured to capture an image (broadly, one or more images) of the UAV landing pad 28 and determine the position of the UAV with respect to the UAV landing pad based on the image (broadly, one or more images). The landing pad location 110 may take several images (e.g., pictures or video) to continuously determine the position of the UAV 12 relative to the UAV landing pad 28 until the UAV has landed on the landing pad. Moreover, the UAV 12 may use the image captured by the landing pad locator 110 to properly orient the UAV relative to the UAV landing pad 28. In one embodiment, the camera of the landing pad locator 110 captures video of the UAV landing pad 28 and the UAV 12 (e.g., controller 102 and/or landing pad locator) uses machine vision to land on the landing pad. In one embodiment, the landing pad locator 110 may include an optical flow sensor and a range finder used to land the UAV 12 on the UAV landing pad 28. In addition, the UAV 12 may make use of machine or reinforcement learning to help train the UAV to land on the UAV landing pad 28, such as in one of select number of orientations.

For example, in one embodiment, the landing pad locator 110 (or controller 102) may store a plurality of different baseline images of the UAV landing pad 28, taken at numerous different known angles and known distances, and compare the image(s) taken by the camera to the baseline images to determine the position and/or orientation of the UAV relative to the UAV landing pad. In this embodiment the landing pad locator 110 (or controller 102) may include processor-executable instructions to execute or run an image classifier that compares the image captured by the camera of the landing pad locator 110 to baseline images stored in an image database, the image classifier identifying the baseline image from the image database that is the closest match to the image from the camera. Each baseline image can have a corresponding label associated with it such as "no landing station," "landing station left," "landing station right," "landing station ahead," "landing station below," etc. The label for each image provides the relevant instructions to the UAV 12 on what flying action (e.g., move left, move right, move down, etc.) to take next. The label may also include the distance between the UAV 12 and the UAV landing pad 28 and the angle required to fly to land on the UAV landing pad. By matching the image from the camera to the closest baseline image using the image classifier and then using the label associated with the matched baseline image, the UAV 12 can modify its flight path to land on the UAV landing pad 28. For example, if the image classifier matches the image from the camera to a baseline image whose corresponding label is "landing station left," the UAV 12 is moved to the left (via the controller 102), to get closer to the UAV landing pad 28. Similarly, if the image classifier matches the image from the camera to a base line image whose corresponding label is "landing station below," the UAV 12 then moves downward. Accordingly, the image classifier is able to determine the relative location of the UAV landing pad 28 relative to the UAV 12 based on the label associated with each baseline image. With each subsequent image captured by the landing pad locator 110, the UAV 12 moves closer and closer to the UAV landing pad 28. This process repeats for each image captured by the camera of the landing pad locator 110 until the UAV 12 has landed on the UAV landing pad 28. This process may be further enhanced by using a reinforcement learning classifier, such as Keras-RL or Tensorforce, to further train the UAV 12 to successfully land on the UAV landing pad 28.

In one exemplary landing sequence using the image classifier, the UAV 12 uses the positioning unit 108 to get relatively close (e.g., less than 100 feet) the UAV station 14. When the UAV 12 reaches the general area of the UAV station 14, the UAV may increase its altitude to several feet above where the UAV station is (e.g., should be) located. The UAV 12 may then rotate while using the camera of the landing pad locator 110 to capture images of the area. The image classifier processes the images, as described above, to identify the UAV landing pad 28 and determine the action that needs to be taken by the UAV 12 in order to land on the UAV landing pad 28. Once the image classifier has identified the UAV landing pad 28, the UAV 12 moves toward the UAV landing pad 28 and the image classifier may continue to process images form the landing pad locator 110 to continuously direct the UAV to the UAV landing pad. Once positioned over the UAV landing pad 28, the UAV 12 may rotate in order to line up with the landing pad (e.g., UAV holder 32). Again, this may be done using the image classifier. Once the image captured by the landing pad locator 110 matches a landed baseline image (e.g., an image corresponding to the UAV being on the UAV landing pad 28), the UAV 12 has landed on the landing pad. The UAV 12 will turn off it's engines 114 and power down in order to have the battery 16 replaced, as described herein. The reinforcement learning classifier can be used to teach the UAV 12 how to orient and position itself relative to the UAV landing pad 28 in order to land on the UAV landing pad 28.

In other embodiments, as mentioned herein, the UAV landing pad 28 may include the landing target 30 that the landing pad locator 110 interacts with to determine the position of the UAV 12 relative to the UAV landing pad 28. In these embodiments, the UAV 12 uses the positioning unit 108 to get relatively close to the UAV station 14 and then uses the landing pad locator 110 in conjunction with the landing target 30 to land on the UAV landing pad 28. For example, if the landing target 30 is the graphic, the landing pad locator 110 reads or scans the graphic to determine the relative position of the UAV 12 to the UAV landing pad 28. If the landing target 30 is the NFC tag, the landing pad locator 110 communicates with the NFC tag to determine the relative position of the UAV 12 to the UAV landing pad 28.

Figure 8:
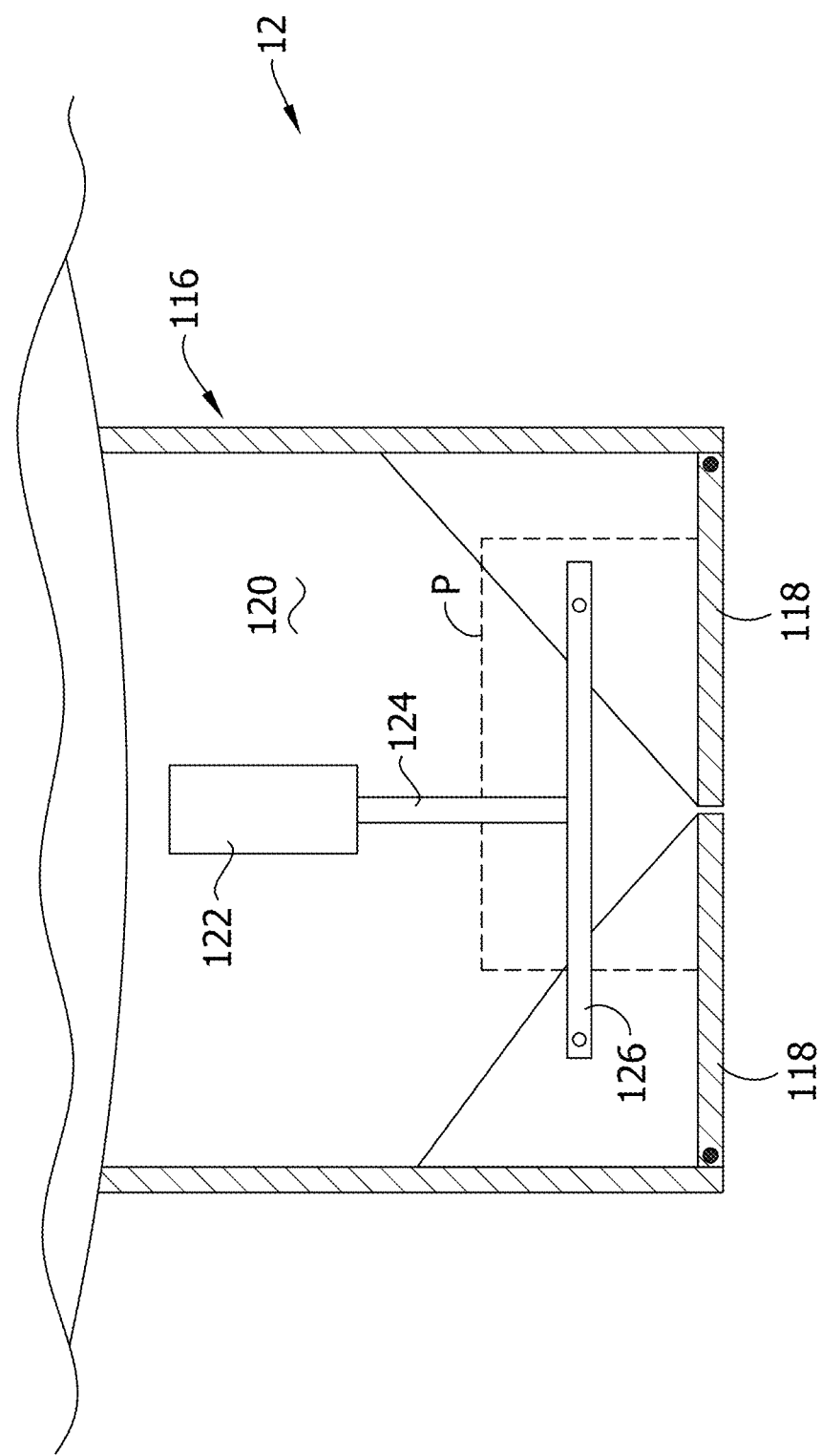
FIG. 8 is a fragmentary cross-section of one embodiment of a package holder of the UAV in a closed configuration.
Figure 9:
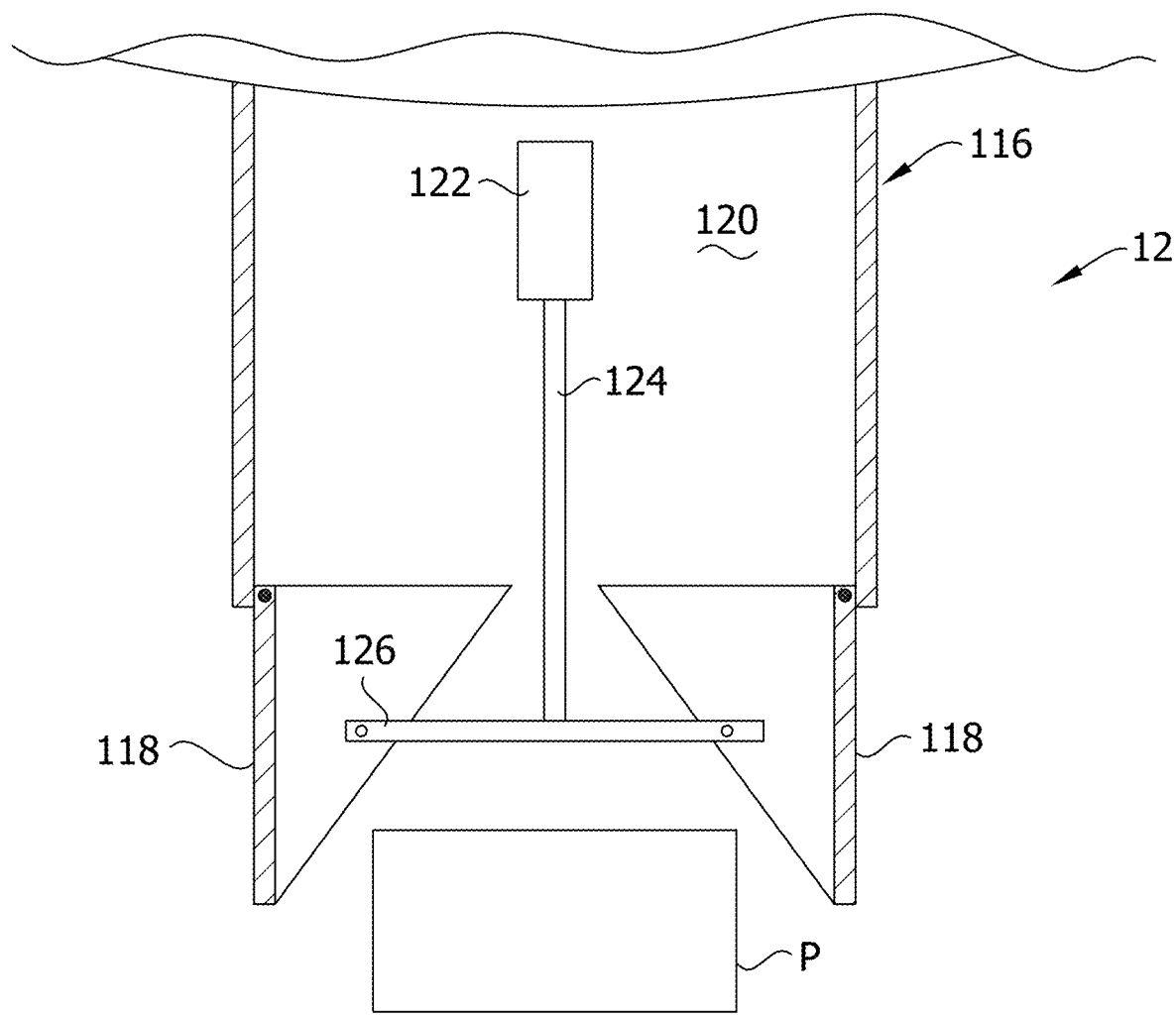
FIG. 9 is a fragmentary cross-section of the package holder in an opened configuration.

The package holder 112 is configured to releasably secure the package P to the UAV 12. The package holder 112 is configured to release the package P when the UAV 12 reaches the delivery location (e.g., delivery coordinates, GPS coordinates, satellite navigation coordinates), to deliver the package. Referring to FIGS. 8 and 9, in the illustrated embodiment, the package holder 116 is a compartment or bay on the underside of the UAV 12. The package holder 116 includes doors 118 (e.g., cam doors) that can be selectively opened to release or drop the package P. In this embodiment, the package holder 116 defines an interior 120 that receives the package P and holds the package P while the UAV 12 is in flight. The lower end of the interior 120 is defined by the doors 118. The doors 118 are operatively connected to a linear actuator 122, via a piston 124 and rod 126, which can move the doors between a closed position (FIG. 8) and an open position (FIG. 9). The linear actuator 122 drives linear or longitudinal movement of the piston 124 and rod 126, which rotates the doors 118 between the open and closed positions. The linear actuator 122 is communicatively coupled to and controlled by the controller 102. For example, after a package P is received in the interior 120, the controller 102 operates the linear actuator 122 to close the doors 118, thereby securing the package to the UAV 12. Similarly, when the package P is to be dropped at the delivery location, the controller 102 operates the linear actuator 122 to open the doors 118, thereby releasing the package. Other types of package holders 116 are within the scope of the present disclosure. For example, the package holder can comprise a hook, gripper fingers, a claw or any other suitable device which can selectively retain (e.g., grab) and release a package. One or more of these alternative package holders, such as a hook, may hold the package P externally of the drone (e.g., not enclosed in a compartment).

The UAV 12 can carry one or more packages P at a time. For example, the UAV 12 can include multiple package holders 116, one for each package P carried by the UAV. The multiple package holders 116 can be individually controlled to release a single designated package P at a delivery location while retaining the other packages on their respective package holders to be delivered to other destinations. In other embodiments, the UAV 12 may include a single package holder 116 that is configured to release multiple packages P individually or together. In one embodiment, multiple UAVs 12 (e.g., two or more UAVs) may work together to carry and deliver a single package P, if the package is too heavy for a single UAV. For example, two or more UAVs 12 may each have a package holder 116 that includes a hook suspended from the body of the UAV. The hooks of each UAV 12 are coupled to the heavy package P to collectively lift, carry and deliver the heavy package.

The UAV 12 may also include a communication port 116, such as a wireless communication port, to communicate with other devices, such as the UAV station 14. The communication port 116 can include an infrared (IR) port, a hardwire port, a Bluetooth port, a cellular port (e.g., cellular communications broadband network) and/or a Wi-Fi port, and it is understood that various other types of communication ports (e.g., near field communication) can be used without departing from the scope of the present disclosure. In one embodiment, where the landing target 30 of the UAV landing pad 28 comprises an NFC tag, the landing pad locator 110 and the communication port 116 may be generally the same (e.g., the landing pad locator is a communication port which communicates with the NFC tag). In one embodiment, the communication port 116 is configured to communicate with the package P carried by the UAV 12. For example, the communication port 116 may be a scanner, such as a radio frequency identification (RFID) scanner, configured to communicate with an identification or package tag (not shown), such as an RFID tag. In this manner, the UAV 12 can obtain information directly from the package P such as an identity (e.g., serial number) of the package, recipient information, delivery destination information (e.g., coordinates), or any combination thereof. The UAV 12 may use the information collected from the package tag when delivering the package P. For example, the UAV 12 may obtain the delivery coordinates from the package tag. Other configurations of the UAV 12 are within the scope of the present disclosure.

Figure 10:
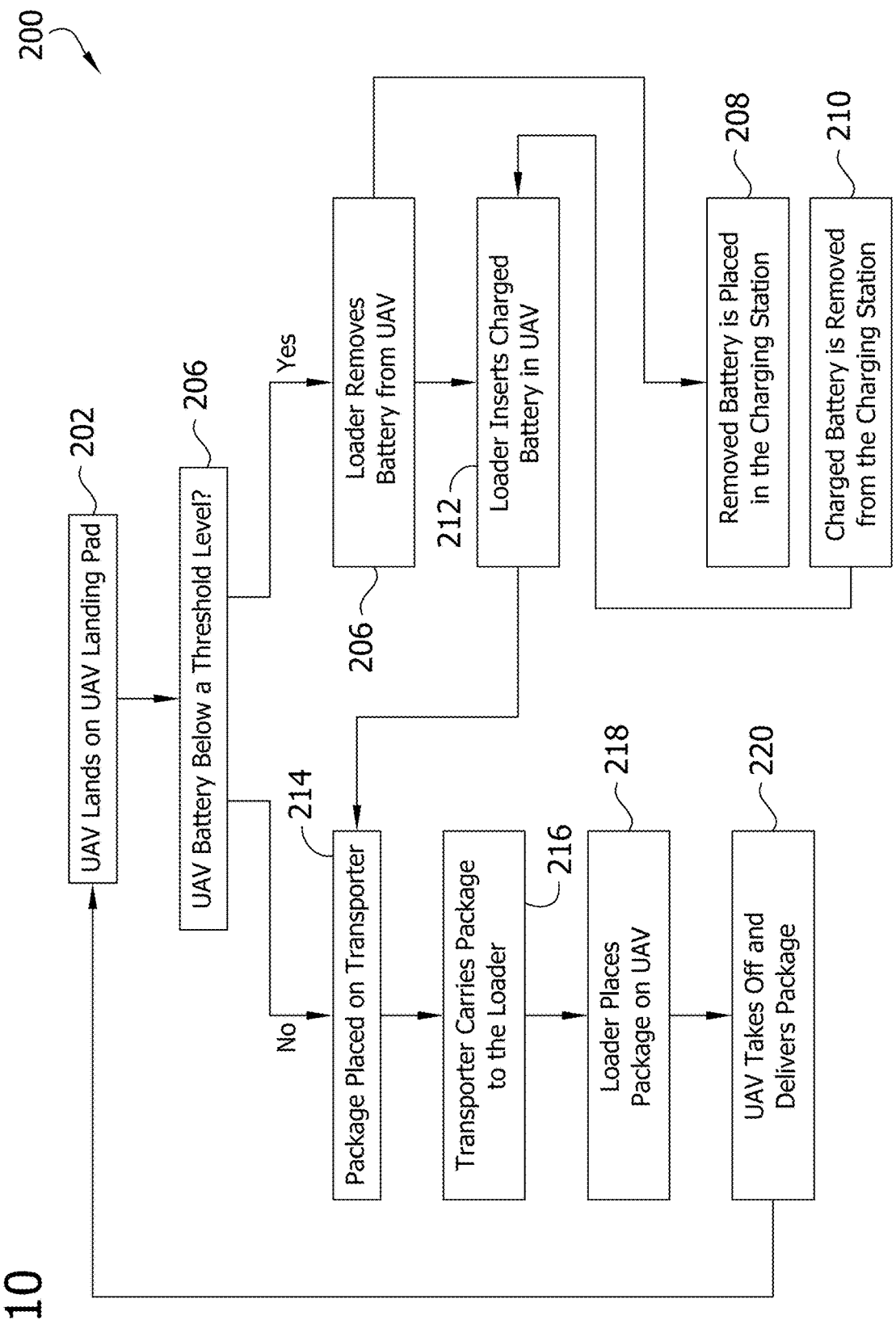
FIG. 10 is an exemplary flow diagram of the operation of the package delivery system.

Referring to FIG. 10, an exemplary flow diagram showing operation of the package delivery system 10 for delivering the packages P with the UAVs 12 is generally indicated at reference numeral 200. For the purposes of this example, a UAV 12 is returning to the UAV station 14 after making a delivery. At step 202, the UAV 12 lands on the UAV landing pad 28. The UAV 12 uses the landing pad locator 110 to land on the UAV landing pad 28. In addition, the UAV 12 may be secured to the UAV landing pad 28 by the UAV holder 32. At step 202, the controller 102 of the UAV 12 communicates the charge level of the UAV's battery 16 to the controller 62 of the UAV station 14. The controller 62 of the UAV station 14 then determines if the charge level of the UAV's battery 16 is below a threshold value. If the charge level is below the threshold value, the process proceeds to step 206 to replace the UAV's battery 16. If the charge level of the UAV's battery 16 is above the threshold value, the process proceeds to step 214 to place the package P on the UAV 12. At step 206, the UAV's battery 16 needs to be replaced. The loader 26 removes the battery 16 from the UAV. This removed battery 16 is then placed in a charging port 56 of the charging station 20 to charge, at step 208. As mentioned above, the loader 26 may directly insert the removed battery 16 into the charging port 56 of the charging station 20, or the transporter 24 may be used to carry the removed battery to the charging station. At step 212, the loader 26 grabs a charged battery 16 and inserts the charged battery into the UAV 12. The charged battery 16 was previously removed from the charging station 20, at step 210, and delivered to the loader 26. As mentioned above, the loader 26 may directly remove the charged battery 16 from the charging station 20 or the charged battery may be carried to the loader by the transporter 24.

Before, after, and/or while the charged battery 16 is loaded onto the UAV 12, one or more packages P may be loaded onto the UAV. At step 214, the UAV 12 is ready to receive a package P. A package P is removed from the package receptacle 18 and placed on the transporter 24. The package P is then transported (e.g., delivered) to the loader 26 by the transporter 24, at step 216. At step 218, the loader 26 grabs the package P and places (e.g., loads) the package on the UAV 12. For example, the loader 26 may hand the package P off to the package holder 112 of the UAV 12. In one embodiment, instead of the loader 26, the package P may be manually loaded onto the UAV 12 by a human operator. In such embodiment, the package P may be manually carried from the package receptacle 18 to the UAV 12, or the transporter 24 can still be used. Steps 214-218 can be repeated as necessary until all packages P to be delivered by the UAV 12 are loaded onto the UAV. After the package or packages P are secured on the UAV 12, the UAV takes off and delivers the package to the delivery destination, at step 220. This process 200 then repeats. This process 200, illustrated in FIG. 10, is for one UAV 12, however, it is understood that the UAV station 14 may use multiple UAVs at the same time. In this case, each UAV 12 of the package delivery system 10 will proceed through the process 200 concurrently, even though different UAVs may be at different steps in the process. For example, while one UAV 12 is having its battery or batteries replaced (steps 206-212), another UAV can be delivering a package P (step 220). In one embodiment, while the UAV 12 is on the UAV landing pad 28, the UAV may receive the coordinates for the delivery destination either from the package P or the UAV station 14, as mentioned above.

In one embodiment, the package delivery system 10 is mobile. For example, the package delivery system 10 can be supported by a vehicle, as mentioned above. In this embodiment, the vehicle is used to transport the package delivery system 10 to an area (e.g., neighborhood) where one or more packages P are to be delivered. Specifically, the package delivery system 10 is transported to a take-off position before the UAVs 12 deliver the packages P. The take-off position can be a location that is generally close to the delivery destination of one or more of the packages P (e.g., is within the area where the packages are to be delivered). For example, the take-off position may be located within about a mile of the delivery destination of one or more of the packages P. Desirably, the take-off position is generally centrally located between the delivery destinations of multiple packages P, to maximize the number of packages that can be delivered from the package delivery system 10 at the take-off position. After all the packages P have been delivered within the area, the vehicle can move to another take-off position to deliver packages in a new area. Alternatively, or in addition, the UAVs 12 may be able to take-off and land on the UAV station 14 (specifically, the UAV landing pad 28) while the vehicle supporting the package delivery system 10 is moving.

Figure 11:
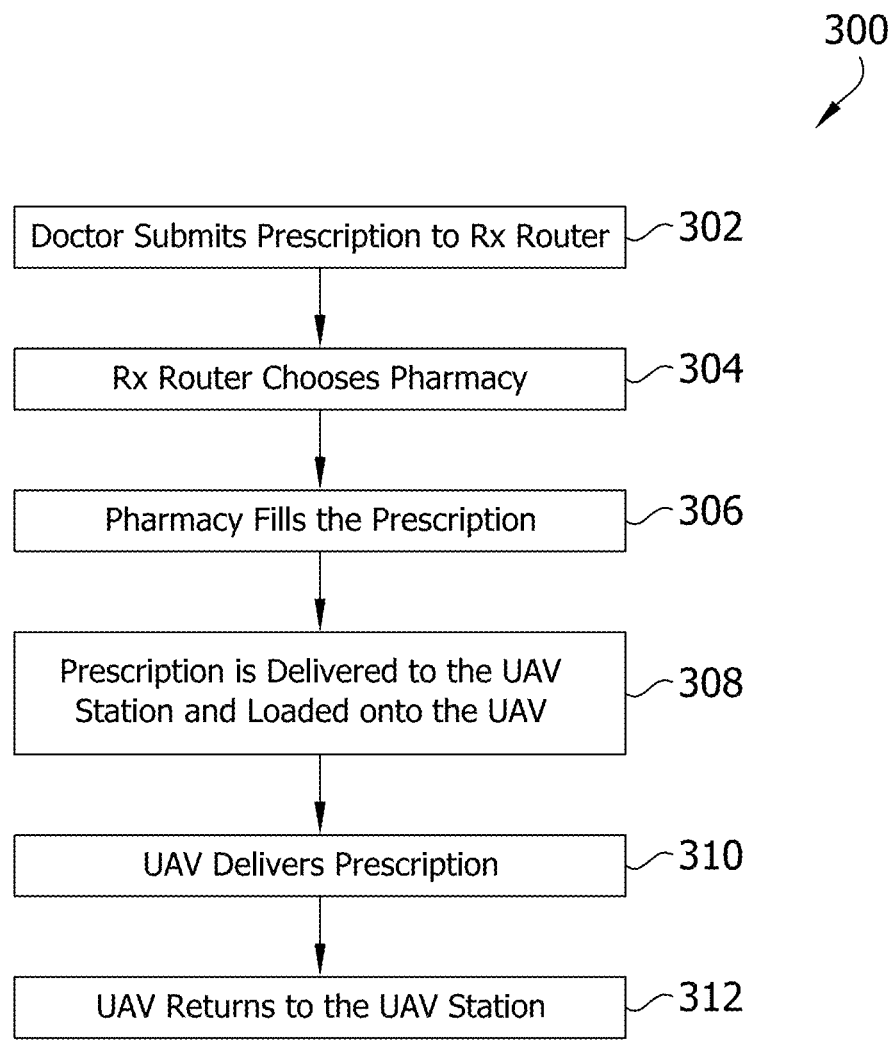
FIG. 11 is an exemplary flow diagram of the package delivery system being used to deliver prescriptions.

Referring to FIG. 11, in one embodiment, the package delivery system 10 may be used as part of a pharmaceutical delivery system to delivery pharmaceuticals (e.g., prescriptions) to patients. In this system, a plurality of pharmacies (e.g., local pharmacies, mail order pharmacies, and/or mobile pharmacies) include a package delivery system 10 to deliver the prescriptions filled by that pharmacy to the patient. Specifically, each pharmacy may include a UAV station 14 to receive UAVs 12 which are then loaded with the packages containing the prescriptions filled by the pharmacy. In an example embodiment, the UAV may fly to a fly-up window at which the landing pad is located. The loader and the battery replacement system may be positioned at the fly-up window. The fly-up window may be on the roof of a pharmacy or in the walls of the pharmacy. The UAVs 12, when loaded with a package and a battery with sufficient charge, fly to the delivery destination to deliver the packages containing the prescriptions.

FIG. 11 is an exemplary flow diagram illustrating one method for how the package delivery system 10 can be used in the pharmaceutical delivery process, generally indicated at reference numeral 300. At step 302, a doctor submits a prescription to be filled to an Rx Router (not shown). Examples of a prescription processing system that can prepare prescription orders for supplying to the UAV are described in U.S. Pat. No. 8,032,395, titled Prescription Management System, and U.S. Pat. No. RE42,766, titled Automatic Prescription Filling, Sorting and Packaging System, which are both incorporated by reference. At step 304, the Rx Router chooses the pharmacy to fill the prescription. The pharmacy may be a local pharmacy, a mail order pharmacy or a mobile pharmacy and, preferably, includes a package delivery system 10. For example, the mobile pharmacy can include the mobile package delivery system 10 as described herein. However, it is understood the Rx Router may send the prescription to be filled to pharmacy that does not have a package delivery system 10.

The Rx Router is a computer implemented system configured to identify and send the prescription submitted by the doctor to a chosen pharmacy. The Rx Router may consider the patient's delivery destination, the pharmacies inventories, UAV delivery capability, cost to fill the prescription, and number of orders in queue at each pharmacy when deciding which pharmacy to send the prescription to. For example, the Rx Router may use the patient's delivery destination to generate a list of eligible pharmacies (e.g., pharmacies in the general area of the patient or capable of getting the filled prescription to the patient). The Rx Router may then check the inventory of the each of the eligible pharmacies to verify the pharmacies can fill the prescription. Pharmacies that do not have the proper inventory are removed from consideration. The Rx Router may then consider additional factors such as if the pharmacy has UAV 12 delivery capability, cost to fill the prescription and number of orders in the queue to choose the best pharmacy. For example, if a pharmacy has too many orders in the queue and will not be able to fill the prescription in a timely manner, the pharmacy can be removed from consideration. Once the best pharmacy is selected, the Rx Router sends the prescription to the pharmacy.

At step 306, the chosen pharmacy fills the prescription. In this case, the chosen pharmacy includes a package delivery system 10 and the filled prescription is then delivered to the package delivery system to deliver the prescription, as described herein. At step 308, the prescription (specifically, the package P containing the prescription) is delivered to the UAV station 14 and is loaded (manually or automatically) onto the UAV 12. At step 310, the UAV 12 then flies to the delivery destination and delivers the prescription. The UAV 12 then returns to the UAV station 14, at step 312. The UAV 12 can then receive another package to make another delivery and, if needed, the battery 16 of the UAV can be exchanged for a fully charged battery, as described herein.

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

It is apparent that the elements, features, and/or teachings set forth in each embodiment disclosed herein are not limited to the specific embodiment(s) the elements, features and/or teachings are described in. Accordingly, it is understood that the elements, features and/or teachings described in one embodiment may be applied to one or more of the other embodiments disclosed herein, even if said elements, features and/or teachings where not described herein as being a part of said one or more of the other embodiments.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A package delivery system for delivering a plurality of packages with one or more unmanned aerial vehicles (UAVs), the system comprising:
- a package receptacle configured to receive and store the plurality of packages;
- a charging station configured to charge a plurality of UAV batteries which power the one or more UAVs;
- a UAV landing pad sized and shaped to permit at least one of the one or more UAVs to land thereon;
- a loader configured to load at least one of a package of the plurality of packages or a UAV battery of the plurality of UAV batteries onto one of the one or more UAVs when said one UAV is on the UAV landing pad; and
- a transporter configured to move at least one of said packages of the plurality of packages or said UAV battery of the plurality of UAV batteries toward the loader.

2. The package delivery system of claim 1, wherein the transporter is configured to at least one of receive said UAV battery from the charging station and deliver the UAV battery to the loader, or receive said package from the package receptacle and deliver the package to the loader.

3. The package delivery system of claim 2, wherein the transporter includes at least one of a conveyor, an elevator or a robotic arm to move at least one of said package or said UAV battery toward the loader.

4. The package delivery system of claim 1, further comprising a power source configured to provide electrical power to charge the plurality of UAV batteries.

5. The package delivery system of claim 1, wherein the UAV landing pad includes at least one UAV holder configured to hold said one UAV on the UAV landing pad.

6. The package delivery system of claim 5, wherein the UAV holder defines a receiving space sized and shaped to receive a portion of said one UAV to hold said one UAV on the UAV landing pad.

7. The package delivery system of claim 1, wherein the UAV landing pad includes a landing location tag configured to communicate with said one UAV to position said one UAV on the UAV landing pad when said one UAV is landing.

8. The package delivery system of claim 7, wherein the landing location tag is configured to communicate using near field communication.

9. The package delivery system of claim 1, further comprising the one or more UAVs.

10. The package delivery system of claim 9, wherein each UAV includes a landing pad locator configured to determine the position of said UAV with respect to the UAV landing pad.

11. The package delivery system of claim 9, wherein the landing pad locator includes at least one camera configured to capture an image of the UAV landing pad and determine the position of the said UAV with respect to the UAV landing pad based on the image.

12. The package delivery system of claim 1, wherein the loader includes a gripper configured to grab at least one of the package or the UAV battery.

13. The package delivery system of claim 1, wherein the loader includes a first gripper configured to grip said one UAV and a second gripper configured to grip said UAV battery on said one UAV to remove said UAV battery when said one UAV is on the UAV landing pad.

14. The package delivery system of claim 13, wherein the second gripper includes at least one suction cup configured to grip said UAV battery.

15. The package delivery system of claim 1, further comprising a vehicle, wherein the package receptacle, the charging station, the UAV landing pad, the loader and the transporter are carried by the vehicle.

16. A method for delivering a plurality of packages with one or more unmanned aerial vehicles (UAVs), the method comprising:
- delivering, with a transporter, a package of the plurality of packages to a loader;
- delivering a charged UAV battery to the loader;
- loading, with the loader, said package on one UAV of the one or more UAVs;
- loading, with the loader, said charged UAV battery on said one UAV; and
- delivering, with said one UAV, said package to a delivery location.

17. The method of claim 16, further comprising:
- removing, with the loader, a UAV battery from said one UAV before loading said charged UAV battery on said one UAV; and
- charging, with a charging station, said removed UAV battery.

18. The method of claim 16, further comprising:
- said UAV landing on a UAV landing pad before loading said package and said charged UAV battery on said UAV.

19. The method of claim 17, further comprising:
- securing said one UAV on the UAV landing pad with a UAV holder.

20. The method of claim 16, further comprising:
- transporting the one or more UAVs, transporter, loader, plurality of packages, and charged UAV battery on a vehicle to a take-off position before delivering said one package with said one UAV.

21. The package delivery system of claim 1, wherein the loader is configured to load the package onto said one UAV when said one UAV is on the UAV landing pad.

22. The package delivery system of claim 1, wherein the loader is configured to load the UAV battery onto said one UAV when said one UAV is on the UAV landing pad.

23. The package delivery system of claim 22, wherein the loader is configured to load the package onto said one UAV when said one UAV is on the UAV landing pad.

* * * * *